(12) United States Patent
Gehring et al.

(10) Patent No.: US 6,439,525 B1
(45) Date of Patent: Aug. 27, 2002

(54) REMOVABLE CONTAINER HOLDING ASSEMBLY

(75) Inventors: Thomas F. J. Gehring, Scarborough; Dejan Havidic, Toronto; Michael J. Avila, Scarborough, all of (CA)

(73) Assignee: Collins & Aikman Products Co., Troy, MI (US)

( * ) Notice: Subject to any disclaimer, the term of this patent is extended or adjusted under 35 U.S.C. 154(b) by 0 days.

(21) Appl. No.: 09/686,767

(22) Filed: Oct. 10, 2000

(51) Int. Cl.[7] .................................................. B60N 3/10
(52) U.S. Cl. ..................................... 248/311.2; 224/926
(58) Field of Search .......................... 248/311.2, 240.4; 224/926

(56) References Cited

U.S. PATENT DOCUMENTS

| | | | | |
|---|---|---|---|---|
| 102,947 | A | * 5/1870 | Krauser | 248/240.4 |
| 4,783,037 | A | 11/1988 | Flowerday | 248/311.2 |
| 4,828,211 | A | * 5/1989 | McConnell et al. | 248/311.2 |
| 4,928,865 | A | 5/1990 | Lorence et al. | 224/275 |
| 4,943,111 | A | 7/1990 | VanderLaan | 297/194 |
| 5,007,610 | A | 4/1991 | Christiansen et al. | 248/311.2 |
| 5,060,899 | A | 10/1991 | Lorenmce et al. | 248/311.2 |
| 5,141,194 | A | * 8/1992 | Burgess et al. | 248/311.2 |
| 5,238,211 | A | * 8/1993 | Borovski | 248/311.2 |
| 5,316,368 | A | 5/1994 | Arbisi | 297/194 |
| 5,318,266 | A | * 6/1994 | Liu | 248/311.2 |
| 5,318,343 | A | 6/1994 | Spykeman et al. | 297/194 |
| 5,342,009 | A | * 8/1994 | Lehner | 248/311.2 |
| 5,423,508 | A | * 6/1995 | Isenga et al. | 248/311.2 |
| 5,505,516 | A | 4/1996 | Spykerman et al. | 248/311.2 |
| 5,562,331 | A | 10/1996 | Spykerman et al. | 297/188.16 |
| 5,601,268 | A | 2/1997 | Dunchock | 248/311.2 |
| 5,628,486 | A | 5/1997 | Rossman et al. | 248/311.2 |
| 5,671,877 | A | 9/1997 | Yabuya | 224/282 |
| 5,899,426 | A | * 5/1999 | Gross et al. | 248/311.2 |
| 5,997,082 | A | * 12/1999 | Vincent et al. | 297/188.19 |
| 6,047,937 | A | * 4/2000 | Huang | 248/311.2 |
| 6,095,471 | A | * 8/2000 | Huang | 248/311.2 |
| 6,227,509 | B1 | * 5/2001 | Plocher et al. | 248/311.2 |
| 2002/0050501 | A1 | * 5/2002 | Shimajiri | 224/282 |

* cited by examiner

*Primary Examiner*—Leslie A. Braun
*Assistant Examiner*—Ingrid Weinhold
(74) *Attorney, Agent, or Firm*—Myers Bigel Sibley & Sajovec

(57) ABSTRACT

The container holding assembly includes a base defining a planar surface. The container holding assembly also includes a lid which is pivotally secured to the base at a pivot point offset from the base. A stabilizing arm is connected to the lid. The stabilizing arm is movable between a retracted position when the lid is in a closed position and a stabilizing position when the lid is in an open position. The stabilizing arm includes two back ends which move through slots defined by protrusions extending out from the interior surface of the lid. The container holding assembly also includes a linkage which extends between the stabilizing arm and the pivot point. The linkage orients the stabilizing arm when the back ends of the stabilizing arm transit the slots secured to the lid. A bale arm is pivotally secured to the linkage. The bale arm includes an extension and a container receiving arm. The bale arm prevents the lid from moving out of the open position when the container receiving arm receives a container thereon. The container receiving arm extends between two extensions of the bale arm and is not secured to any other structure. Two rings in the base have slots. The slots receive the container receiving arm therein when the container receiving arm abuts the base preventing the container receiving arm from sliding along the base. The base includes a set of anchors. The container holding assembly is removable from a structure defining a structure perimeter that matches the perimeter of the base. A wall extending between a top surface and a recess surface defines the structure perimeter. The wall prevents the container holding assembly from sliding along the surface upon which it rests, i.e., the recess surface of the console.

6 Claims, 3 Drawing Sheets

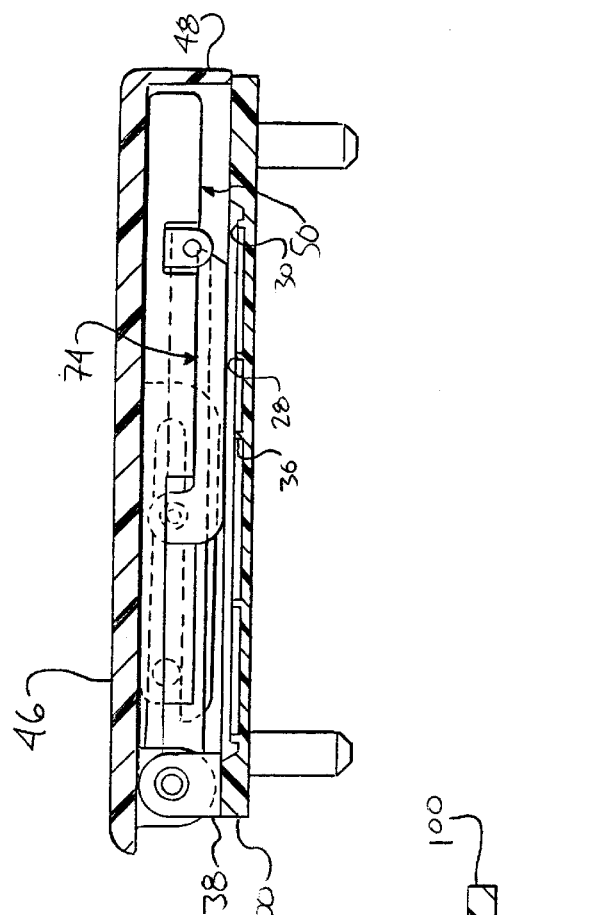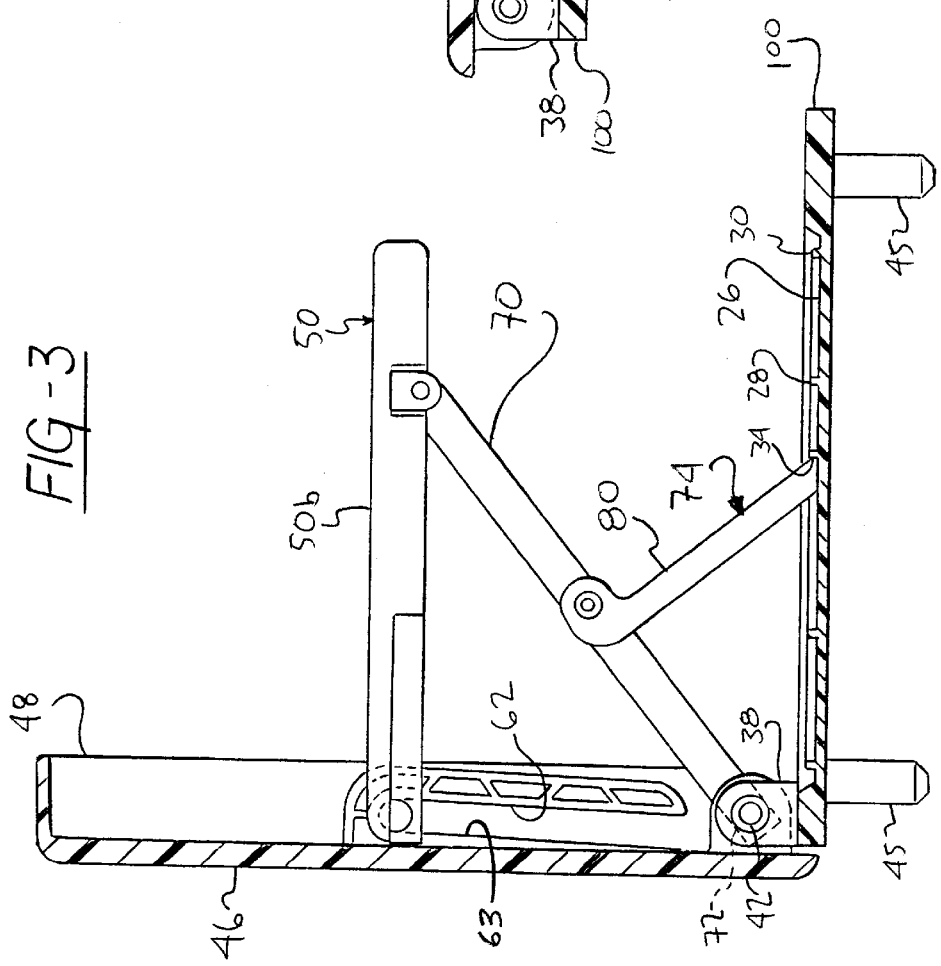

REMOVABLE CONTAINER HOLDING ASSEMBLY

BACKGROUND OF THE INVENTION

1. Field of the Invention

The invention relates to a container holding assembly for a motor vehicle. More specifically, the invention relates to a removable container holding assembly.

2. Description of the Related Art

Container holding assemblies in motor vehicles are installed in every imaginable position in the passenger compartment thereof. This is partly due to the addition of other components and, in some instances, the desire to create a cockpit affect resulting in the clustering of components near each other. A non-exhaustive list of operating components that may be found in the passenger compartment include a parking brake, transmission shift lever, window controls, coin holders, compartment doors, ashtrays and the like. A disadvantage develops as space for such devices becomes scarce. A container holding assembly may take up valuable space on a console. This space could be used for other devices when a beverage is not being consumed.

U.S. Pat. No. 5,601,268, issued to Dunchock on Feb. 11, 1997, discloses a container holding device. The container holding device incorporates an intermediate device to attach a stowable container holding device to an existing console. The intermediate device includes a tray upon which the stowable container holding device rests and a downwardly directed member which is received by an opening in the console. The tray includes a fastening device, i.e., hook and loop fasteners, glue, screws and the like, to maintain the stowable container holding device in fixed relation with the tray. This assembly is deficient because the underlying console must also be a container holding device of some sort. If an occupant of a motor vehicle does not wish to have a container holding device, he will not remove the stowable container holding device only to access a permanent container holder designed to be integral with the console or other such supporting structure. In addition, the design is inferior because the fasteners will either wear to the point of non-usefulness or they will be too permanent to facilitate the quick removal of the stowable container holding device.

SUMMARY OF THE INVENTION

An assembly for holding a container includes a structure having a top surface, a recess surface and a wall extending therebetween. The wall defines a structure perimeter. The assembly also includes a base defining a pivot point and a base perimeter. The base perimeter matches the structure perimeter such that the base is receivable within the wall. The base rests on the recess surface. A lid is pivotally secured to the base. The lid is movable between a closed position covering the base and an open position providing access to the base. The assembly further includes a stabilizing arm that is connected to the lid. The stabilizing arm is movable between a retracted position when the lid is in a closed position and a stabilizing position when the lid is in an open position. The stabilizing arm stabilizes a container when the container is placed on the base. A linkage extends between the stabilizing arm and a pivot point to orient the stabilizing arm when in each of the retracted and stabilizing positions.

An advantage associated with the invention is the ability to provide a stable container holding assembly in a congested environment. Another advantage associated with the invention is the ability to stow the container holding assembly providing the space disposed therebelow available for another function.

BRIEF DESCRIPTION OF THE DRAWINGS

Other advantages of the invention will be readily appreciated as the same becomes better understood by reference to the following detailed description when considered in connection with the accompanying drawings, wherein:

FIG. 3 is a cross-sectional side view of one embodiment of the invention shown in a use position; and FIG. 4 is a cross-sectional side view of one embodiment of the invention shown in a storage position.

DETAILED DESCRIPTION OF THE PREFERRED EMBODIMENT(S)

Figure 1:
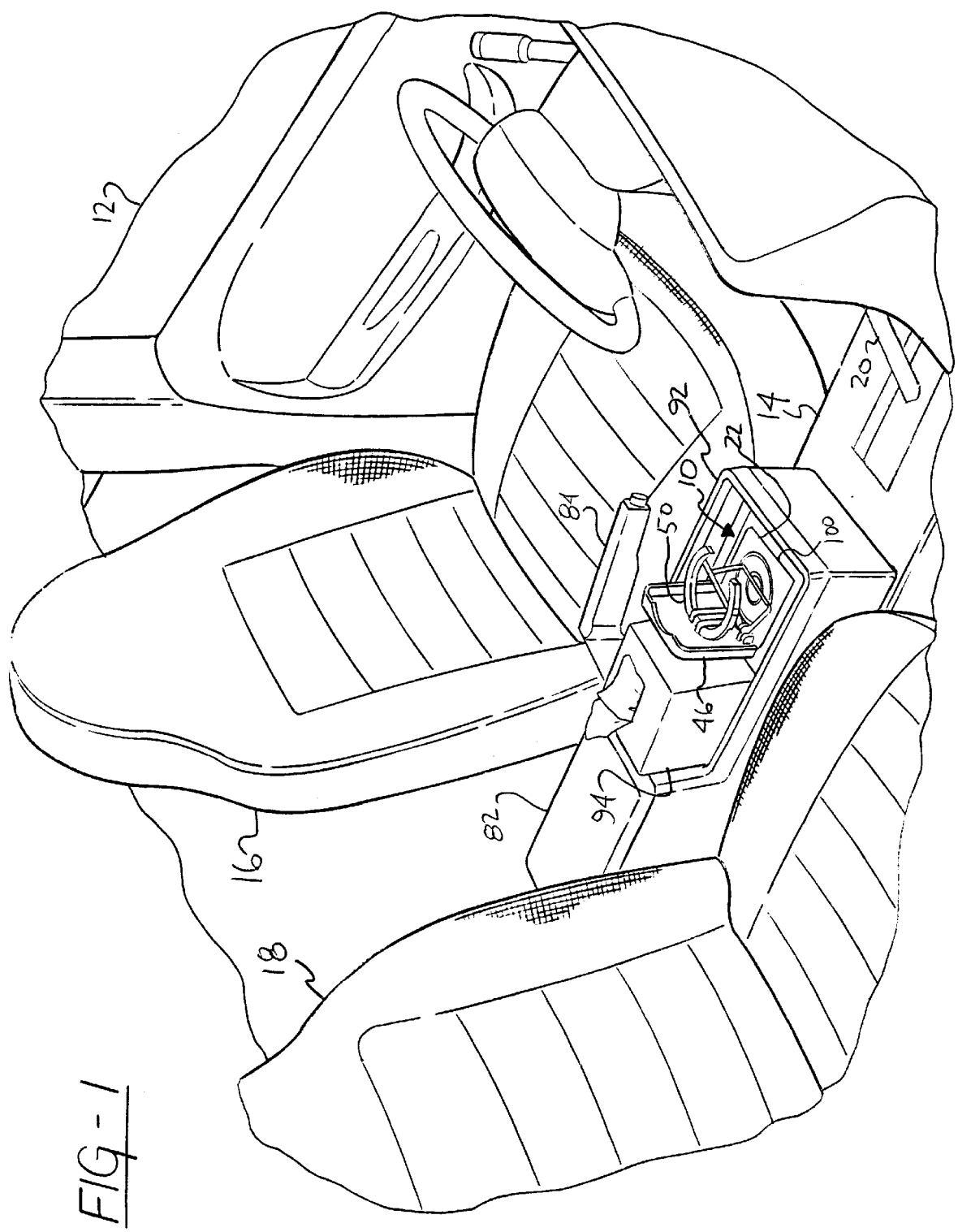
FIG. 1 is a perspective view of one embodiment of the invention shown in a passenger compartment, partially cut away, of an automotive vehicle.

Referring to FIG. 1, a container holding assembly ("cup holder") is generally indicated at 10. The cup holder 10 is located in a passenger compartment 12 of a motor vehicle (not shown). The cup holder 10 is shown on the top of a console 14 between a driver seat 16 and a passenger seat 18. A transmission shift lever 20 extends out of the console 14 at a position disposed adjacent the cup holder 10.

Figure 2:
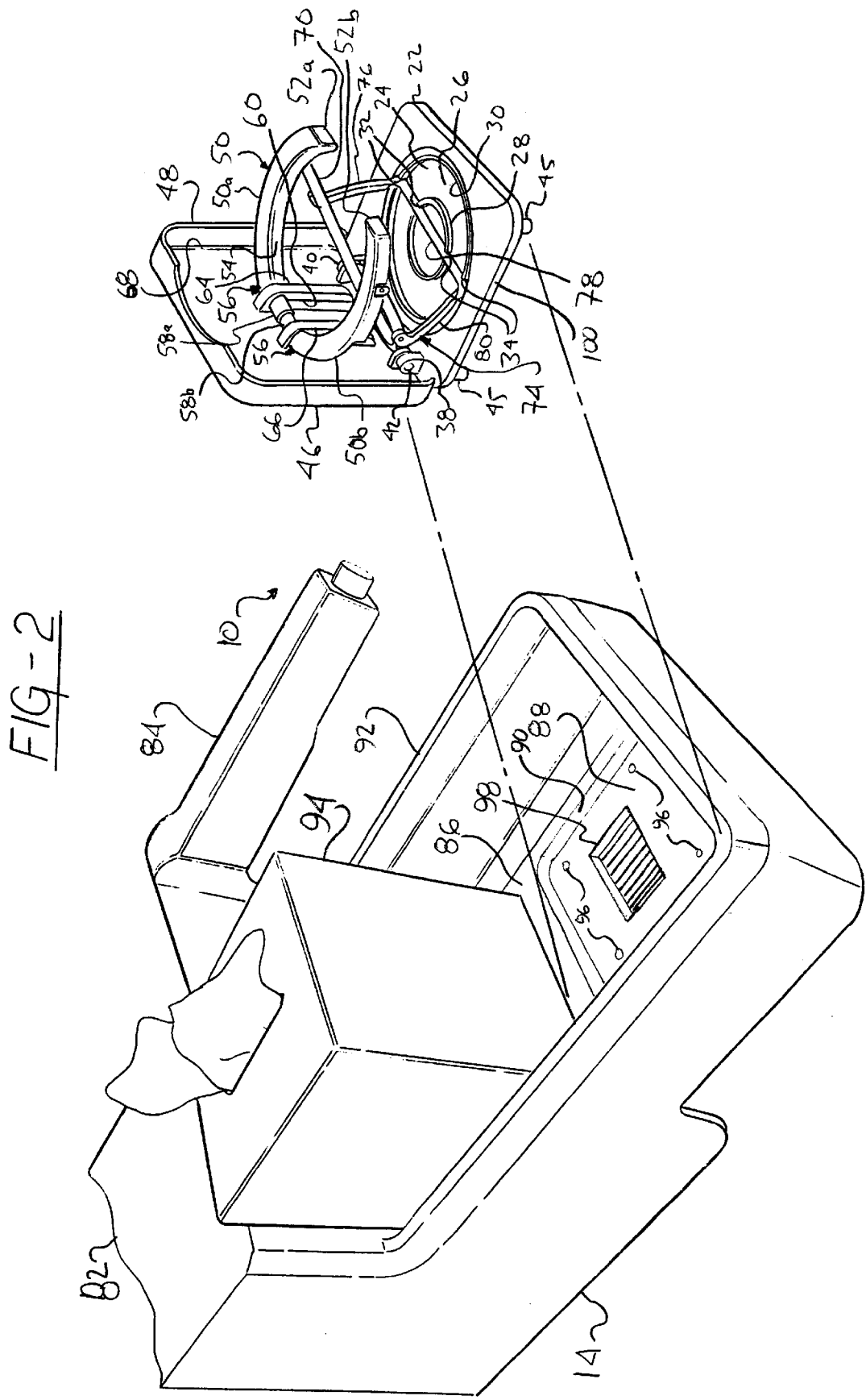
FIG. 2 is an exploded perspective view of one embodiment of the invention.

Referring to FIGS. 1 and 2, the cup holder 10 includes a base 22. As shown in the Figures, the structure onto which the base 22 is placed is the console 14. The base 22 defines a recess 24 for receiving a bottom of a cup or container (not shown) therein. The recess 24 defines a bottom surface 26 that includes two rings 28, 30 extending up therefrom. These rings 28, 30 are anti-tipping rings that prevent the cup from tipping by preventing the bottom of the cup or container ("cup") from slipping along the bottom surface 26 of the recess 24. Each of the rings 28, 30 have two cuts 32, 34. The cuts 32, 34 define a channel 36 which will be discussed in greater detail subsequently. Extending up from the base 22 are two posts 38, 40. Each of the posts 38, 40 define a respective hole 42 (hole 42 in post 38 is visible in the Figures, hole 42 in post 40 is obscured from view in the Figures; however, both holes 42 are identical). The holes 42 are coaxial and define a pivot point. The pivot point is set up from and disposed relative to the base 22. Anchors or posts 45 extend down from the base 22 and will be discussed subsequently.

Pivotally secured to the base 22 is a lid 46. The lid 46 is pivotally secured to the base 22 at the pivot point. The lid 46 is movable between a closed position covering the base 22 and an open position providing access to the base 22. A peripheral lip 48 extends around the lid 46 covering the entire mechanism of the cup holder 10 when the lid 46 is in the closed position. This allows the mechanisms of the cup holder 10 to be covered and protected when the cup holder 10 is removed from the console 14.

A stabilizing arm 50 is connected to the lid 46. The stabilizing arm 50 is movable between a retracted position when the lid 46 is in its closed position and a stabilizing position when the lid 46 is in its open position. The stabilizing arm 50 stabilizes the cup that is placed on the base 22. In the embodiment shown in the Figures, the stabilizing arm 50 has two halves 50a, 50b. The two halves 50a, 50b are arcuate in shape and each extends out to a distal end 52a, 52b. The distal ends 52a, 52b do not meet allowing for odd-shaped cups or cups with handles which will be held by the cup holder 10. While not shown, the stabilizing arm 50 may include rubber spacers along an interior surface 54 of the stabilizing arm 50 to provide for adjustment in cups of different dimensions.

A middle section, generally indicated at 56, of the stabilizing arm 50 is retained in a position of close proximity to the lid 46. As is shown, the middle section 56 may include two back ends 58a, 58b, each of which being the end of one of the halves 50a, 50b of the stabilizing arm 50. The back ends 58a, 58b move inside two slots 60, 62 that are defined by protrusions 64, 66 which extend out from an interior surface 68 of the lid 46. The slots 60, 62 are generally parallel to the interior surface 68. A ramp surface 63 forces the back ends 58a, 58b away from the lid 46 as they travel up the slots 60, 62. The protrusions 64, 66 have a honeycomb structure reducing the weight thereof. The slots 60, 62 are open-ended at a lower end thereof allowing for the removal of the back ends 58a, 58b. The removal of the back ends 58a, 58b would only be required during maintenance and would not be required during the normal operation of the cup holder 10.

A linkage 70 extends between the stabilizing arm 50 and the pivot point defined by the holes 42 in the posts 38, 40. The linkage 70 orients the stabilizing arm 50 when the stabilizing arm 50 moves between its retracted and stabilizing positions. The stabilizing arm 50, linkage 70 and lid 46 move with respect to each other as the lid 46 moves between its open and closed positions. The linkage 70 is U-shaped with a linkage base 72 fixedly secured to and extending tangentially out from the base of the linkage 70. The two ends of the linkage base 72 are received by the holes 42 allowing the linkage 70 to pivot about the linkage base 72.

The cup holder 10 includes a bale arm, generally indicated at 74. The bale arm 74 is secured to the linkage 70. The bale arm 74 includes an extension 76 and a container receiving arm 78. The bale arm 74 is pivotally secured to the linkage 70. Although not shown, the bale arm 74 is spring biased such that it would rest up against the linkage 70. When the lid 46 is moved to its open position perpendicular to the base 22, a cup being received through the stabilizing arm 50 will force the bale arm 74 downwardly due to the weight of the cup on the container receiving arm 78. The container receiving arm 78 stops when it abuts the bottom surface 26 of the base 22 after a cup is placed within the cup holder 10. The container receiving arm 78 will not move along the bottom surface 26 because the container receiving arm 78 will be received within the channel 36 defined by the two cuts 32,34 in the rings 28,30. Therefore, when the container receiving arm 78 is received within the two cuts 32, 34, the bale arm 74 prevents the accidental movement of the lid 46 out of the open position. In other words, the container receiving arm 78 locks the position of the lid 46, stabilizing arm 50 and the linkage 70 with respect to each other, thus providing a stable and protected area to place a cup within the passenger compartment 12 of the motor vehicle. Similar to the linkage 70, the bale arm 74 is U-shaped including the extension 76, a second extension 80 and the container receiving arm 78 extending therebetween.

Referring to FIG. 2, the console 14 includes a compartment, generally shown at 82. A parking brake lever 84 extends out from a side of the console 14. The console 14 includes a top surface 86. The console 14 also includes a recess surface 88. A wall 90 extends between the top 86 and recess 88 surfaces. The console 14 further includes a ridge 92 extending around the top surface 86. The ridge 92 stabilizes larger items such as a box of facial tissues 94.

The recess surface 88 includes a plurality of anchor receiving holes 96 to receive the anchors 45 therein. The recess surface 88 may also provide access to another functional area. In this embodiment, the other functional area is a coin holder 98.

The base 22 defines a perimeter 100 that matches a structure perimeter which is defined by the wall 90. This allows the cup holder 10 to rest on the recess surface 88 without sliding therealong. The receipt of the anchors 45 by the anchor receiving holes 96 also aid in the prevention of slippage or tilting with respect to the recess surface 88.

The embodiment shown in the Figures show a cup holder 10 having a perimeter 100 that is of the same general size as the square box of facial tissues 94. Therefore, it is possible to replace the box of facial tissues 94 with a second cup holder 10. Thus, two cups can be held at a single time in the console 14.

The invention has been described in an illustrative manner. It is to be understood that the terminology which has been used is intended to be in the nature of words of description rather than of limitation.

Many modifications and variations of the invention are possible in light of the above teachings. Therefore, within the scope of the appended claims, the invention may be practiced other than as specifically described.

We claim:

1. An assembly for holding a container, said assembly comprising:

a structure including a top surface, a recess surface and a wall extending between said top surface and said recess surface, said wall defining a structure perimeter;

a base defining a pivot point and a base perimeter, said base perimeter matching said structure perimeter, said base receivable by said recess surface such that said base rests on said recess surface;

a lid pivotally secured to said base at said pivot point and movable between a closed position covering said base and an open position providing access to said base, wherein said lid comprises an interior surface and a member attached to the interior surface, and wherein an elongated slot is formed within the member;

a stabilizing arm slidably connected to said lid, wherein said stabilizing arm comprises a portion that slidably communicates with said slot such that said stabilizing arm is movable between a retracted position when said lid is in said closed position and a stabilizing position when said lid is in said open position, said stabilizing arm configured to stabilize a container when the container is placed on said base; and a linkage extending between said stabilizing arm and said pivot point orienting said stabilizing arm when in each of said retracted and stabilizing positions.

2. An assembly as set forth in claim 1 wherein said base includes an anchor for preventing said base from being moved away from said recess surface.

3. An assembly as set forth in claim 2 wherein said anchor includes a plurality of posts.

4. An assembly as set forth in claim 3 wherein said recess surface includes a plurality of anchor receiving holes, each of said posts being received by each of said anchor receiving holes.

5. An assembly as set forth in claim 4 wherein said lid includes a peripheral lip such that said peripheral lip protects said assembly when said lid is in said closed position.

6. An assembly for holding a container, said assembly comprising:

a structure including a top surface, a recess surface and a wall extending between said top surface and said recess surface, said wall defining a structure perimeter;

a base defining a base perimeter a pivot point and said base perimeter identical in shape to and less than said structure perimeter such that said base may slide along said wall and rest on said recess surface;

a lid pivotally secured to said base at said pivot point and movable between a closed position covering said base and an open position providing access to said base, wherein said lid comprises an interior surface and a member attached to the interior surface, and wherein an elongated slot is formed within the member;

a stabilizing arm that slidably communicates with said slot so as to be movable between a retracted position when said lid is in said closed position and a stabilizing position when said lid is in said open position, said stabilizing arm configured to stabilize a container when the container is placed on said base; and an anchor preventing said base from being moved away from said recess surface.

* * * * *